US009883472B1

United States Patent
Tamhane et al.

(10) Patent No.: US 9,883,472 B1
(45) Date of Patent: Jan. 30, 2018

(54) METHODS AND APPARATUS FOR BEACONING WITHIN A WIRELESS NETWORK BASED ON AN INDICATION OF DISTANCE

(71) Applicant: Marvell International Ltd., Hamilton (BM)

(72) Inventors: Sagar A. Tamhane, Santa Clara, CA (US); Paul A. Lambert, Mountain View, CA (US); Binh Quoc Tran, Los Altos, CA (US); Sarang Shrikrishna Wagholikar, Sunnyvale, CA (US); Liwen Chu, San Ramon, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 167 days.

(21) Appl. No.: 14/693,744

(22) Filed: Apr. 22, 2015

Related U.S. Application Data

(60) Provisional application No. 61/986,700, filed on Apr. 30, 2014.

(51) Int. Cl.
*H04W 84/20* (2009.01)
*H04W 56/00* (2009.01)
(Continued)

(52) U.S. Cl.
CPC ......... *H04W 56/001* (2013.01); *G01S 5/0036* (2013.01); *H04L 29/08441* (2013.01);
(Continued)

(58) Field of Classification Search
CPC ..... H04W 56/001; H04W 4/08; H04W 84/20; H04W 40/244; H04W 40/38;
(Continued)

(56) References Cited

U.S. PATENT DOCUMENTS 7,813,326 B1 * 10/2010 Kelm ...................... H04L 45/08
370/238
8,279,810 B1 * 10/2012 Li .......................... H04W 4/006
370/328

(Continued)

OTHER PUBLICATIONS

"Final Office Action", U.S. Appl. No. 14/281,671, dated Apr. 25, 2016, 14 pages.

(Continued)

*Primary Examiner* — Edan Orgad
*Assistant Examiner* — Ivan O Latorre

(57) ABSTRACT

The present disclosure describes methods and apparatus for beaconing within a wireless network based on an indication of distance. For certain example embodiments, in a wireless network in which a master device is a device configured to transmit a beacon within the wireless network, a first wireless communication device may determine, based on an indication of distance between two wireless communication devices, if the first wireless communication device is to act as a master device. For example, a wireless signal may be received. Based at least partially on the received wireless signal, an indication of distance between two wireless communication devices in a wireless network may be obtained. And based at least partially on the obtained indication of distance between the two wireless communication devices, it may be determined if a first wireless communication device is to act as a master device within the wireless network.

20 Claims, 10 Drawing Sheets

(51) Int. Cl.
*H04W 4/08* (2009.01)
*H04L 29/08* (2006.01)
*G01S 5/00* (2006.01)
*H04W 40/38* (2009.01)
*H04W 40/24* (2009.01)

(52) U.S. Cl.
CPC ...... *H04L 67/1044* (2013.01); *H04L 67/1048* (2013.01); *H04W 4/08* (2013.01); *H04L 29/08306* (2013.01); *H04W 40/244* (2013.01); *H04W 40/38* (2013.01); *H04W 84/20* (2013.01)

(58) Field of Classification Search
CPC ........... H04L 29/08441; H04L 67/1044; H04L 67/1048; H04L 29/08306; G01S 5/0036
See application file for complete search history.

(56) References Cited

U.S. PATENT DOCUMENTS

| | | | |
|---|---|---|---|
| 8,437,290 B2 | 5/2013 | Kalhan | |
| 8,576,961 B1 | 11/2013 | Zhu et al. | |
| 9,204,244 B2 | 12/2015 | Rantala et al. | |
| 9,521,635 B1 | 12/2016 | Lambert | |
| 9,736,801 B1 | 8/2017 | Lambert | |
| 2002/0082035 A1* | 6/2002 | Aihara | H04W 84/20 455/518 |
| 2005/0088980 A1 | 4/2005 | Olkkonen et al. | |
| 2005/0089005 A1* | 4/2005 | Sakoda | H04W 74/0816 370/348 |
| 2006/0019653 A1 | 1/2006 | Stamoulis et al. | |
| 2008/0181154 A1 | 7/2008 | Sherman | |
| 2009/0092112 A1* | 4/2009 | Kim | H04W 84/20 370/338 |
| 2009/0296866 A1* | 12/2009 | Hsieh | H04J 3/0685 375/371 |
| 2012/0188998 A1* | 7/2012 | Philips | H04W 56/001 370/350 |
| 2013/0132502 A1* | 5/2013 | Stacey | H04W 56/0015 709/208 |
| 2013/0143499 A1* | 6/2013 | Ando | H04W 4/021 455/41.2 |
| 2013/0148639 A1 | 6/2013 | Gao et al. | |
| 2013/0329620 A1 | 12/2013 | Kim et al. | |
| 2014/0036787 A1* | 2/2014 | Ganu | H04W 16/10 370/329 |
| 2014/0045536 A1* | 2/2014 | Sydir | H04W 4/021 455/456.5 |
| 2014/0092877 A1 | 4/2014 | Kazmi et al. | |
| 2014/0171109 A1* | 6/2014 | Segev | G01S 5/0027 455/456.1 |
| 2014/0200044 A1* | 7/2014 | Kimura | H04W 16/14 455/509 |
| 2014/0313966 A1* | 10/2014 | Shukla | H04W 48/10 370/312 |
| 2015/0006633 A1* | 1/2015 | Vandwalle | H04L 67/1051 709/204 |
| 2015/0036540 A1* | 2/2015 | Kasslin | H04W 48/18 370/254 |
| 2015/0098388 A1* | 4/2015 | Fang | H04W 48/16 370/328 |
| 2015/0109981 A1* | 4/2015 | Patil | H04L 67/1078 370/311 |
| 2015/0131529 A1* | 5/2015 | Zhou | H04W 84/18 370/328 |
| 2015/0131571 A1* | 5/2015 | Fodor | H04W 4/005 370/329 |
| 2015/0172391 A1* | 6/2015 | Kasslin | H04L 67/16 370/338 |
| 2015/0200811 A1* | 7/2015 | Kasslin | H04L 41/12 370/254 |
| 2015/0230043 A1* | 8/2015 | Yakir | H04W 4/008 455/426.1 |
| 2016/0209200 A1* | 7/2016 | Kanayama | H04L 12/40 |
| 2016/0345242 A1* | 11/2016 | Kim | H04W 48/16 |
| 2017/0019869 A1* | 1/2017 | Kim | H04L 43/16 |

OTHER PUBLICATIONS

"Non-Final Office Action", U.S. Appl. No. 14/281,693, dated Feb. 18, 2016, 4 pages.
"Notice of Allowance", Application No. 14/281,693, dated Aug. 8, 2016, 7 pages.
"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11-2012, Mar. 29, 2012, 2793 pages.
"Non-Final Office Action", U.S. Appl. No. 14/281,671, dated Nov. 27, 2015, 12 pages.
"Non-Final Office Action", U.S. Appl. No. 14/281,671, dated Nov. 22, 2016, 12 pages.
"Notice of Allowance", U.S. Appl. No. 14/281,671, dated Apr. 4, 2017, 5 pages.
"Notice of Allowance", U.S. Appl. No. 15/362,657, dated May 30, 2017, 6 pages.

\* cited by examiner

METHODS AND APPARATUS FOR BEACONING WITHIN A WIRELESS NETWORK BASED ON AN INDICATION OF DISTANCE

CROSS REFERENCE TO RELATED APPLICATION

This present disclosure claims priority to U.S. Provisional Patent Application Ser. No. 61/986,700 filed Apr. 30, 2014, the disclosure of which is incorporated herein by reference in its entirety.

BACKGROUND

Wireless interconnectivity is becoming increasingly pervasive in a myriad of devices across many different environments. For example, pursuit of the so-called "internet of things" may result in wireless computing technology being embedded in many different types of objects, from shoes to refrigerators in consumer environments and from manufacturing equipment to inventory management containers in commercial environments. With the mushrooming of wireless interconnectivity, various devices may have significantly different native capabilities or may have direct access to dramatically different network features. If such capabilities or features were to be restricted to their respective devices, potential benefits of expanding wireless interconnectivity would be appreciably limited.

One example wireless interconnectivity scheme to permit communication among various devices is the Neighbor Awareness Networking (NAN) (or Wi-Fi Aware™) program being standardized by the Wi-Fi Alliance. (WFA). Within the NAN protocol stack the MAC is responsible for acquiring and maintaining time and frequency synchronization among devices that are dose by, so that the devices can be available to perform discovery protocol message exchanges in the same channel at the same time. Synchronization among the devices occurs through dedicated synchronization frames that are transmitted by so-called master devices at the beginning of availability periods (or discovery windows). Synchronization frames are transmitted periodically in certain channels. Periodicity and channel usage is determined by parameters set forth within a synchronization frame, Within a NAN network, each device typically needs to be capable of acting as a master device, and each device is expected to determine for each availability period whether it is a master device or not. The synchronization frames determine the schedule (time and frequency) of both the synchronization frame transmissions and the availability periods or discovery windows.

SUMMARY

In general, in one aspect, this specification describes a first wireless communication device that is configured to determine, based on an indication of distance between two wireless communication devices, if the first wireless communication device is to act as a master device within a wireless network, wherein a master device is a device configured to transmit a beacon within the wireless network. The first wireless communication device may include a transceiver and a controller. The transceiver may be configured to receive a wireless signal. The controller may be configured to obtain an indication of distance between two wireless communication devices in the wireless network based at least partially on the wireless signal received by the transceiver. The controller may further be configured to determine, based at least partially on the indication of distance between the two wireless communication devices, if the first wireless communication device is to act as a master device within the wireless network.

In general, in another aspect, this specification describes a method for a first wireless communication device to determine, based on an indication of distance between two wireless communication devices, if the first wireless communication device is to act as a master device within a wireless network, wherein a master device is a device configured to transmit a beacon within the wireless network. The method may include receiving a wireless signal. The method may also include obtaining an indication of distance between two wireless communication devices in the wireless network based at least partially on the received wireless signal. The method may further include determining, based at least partially on the obtained indication of distance between the two wireless communication devices, if the first wireless communication device is to act as a master device within the wireless network.

In general, in yet another aspect, this specification describes a computer-readable memory device comprising computer-executable instructions that, when executed, cause a first wireless communication device to determine, based on an indication of distance between two wireless communication devices, if the first wireless communication device is to act as a master device within a wireless network, wherein a master device is a device configured to transmit a beacon within the wireless network, with the first wireless communication device configured to: receive a wireless signal. Responsive to execution of the computer-executable instructions, the first wireless communication device is further configured to: (i) obtain an indication of distance between two wireless communication devices in the wireless network based at least partially on the received wireless signal and (ii) determine, based at least partially on the obtained indication of distance between the two wireless communication devices, if the first wireless communication device is to act as a master device within the wireless network.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference number in different instances in the description and the figures indicates like elements.

FIGS. 4-1 and 4-2 are flowcharts illustrating example processes for beaconing within a wireless network based on an indication of distance or NAN proximity-based enhancement in which a master role in a cluster of wireless communication devices may be determined using an indication of distance in accordance with one or more example embodiments.

DETAILED DESCRIPTION

Figure 1:
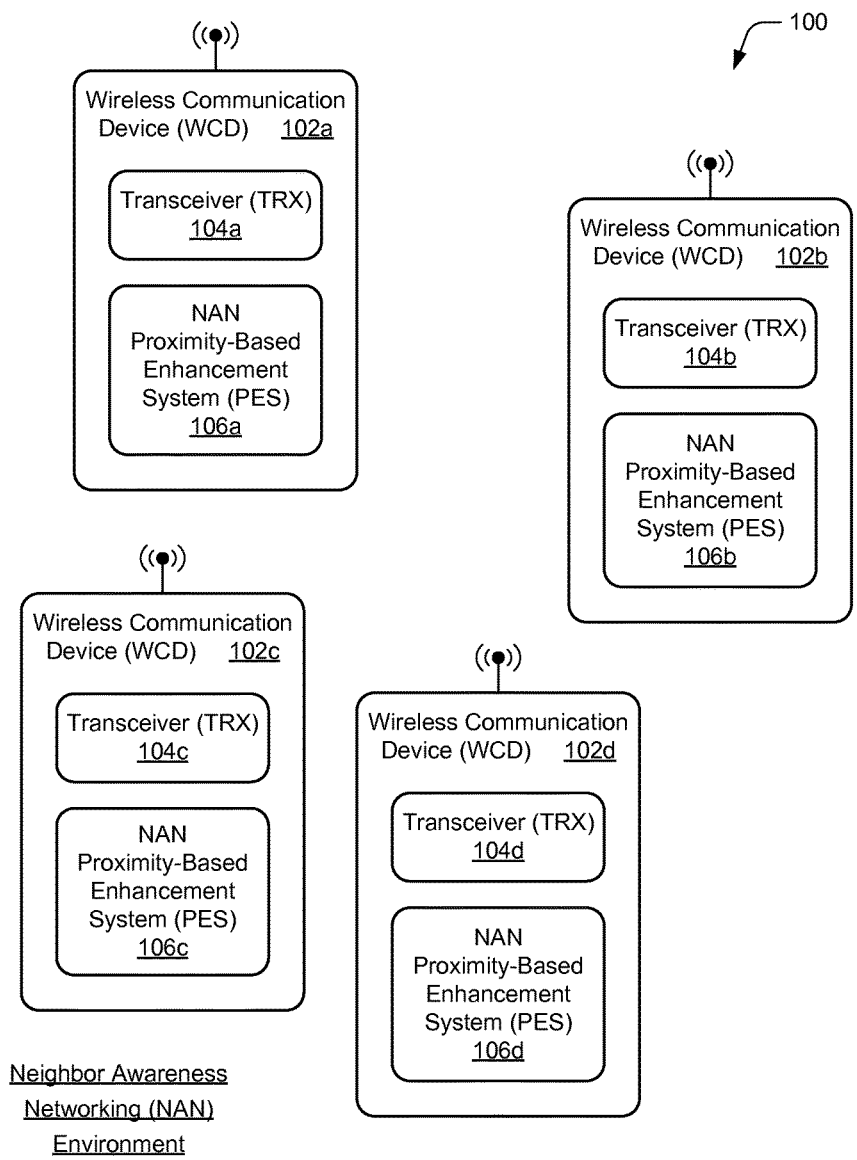
FIG. 1 depicts an example neighbor awareness networking (NAN) environment that includes wireless communication devices for which methods and apparatus for beaconing within a wireless network based on an indication of distance may be implemented in accordance with one or more example embodiments.

As noted hereinabove, various devices may have significantly different native capabilities or direct access to dramatically different network features. Examples of native capabilities may include processing speed, display size or resolution, agency authority or accessibility, installed software, person-machine interface options, locally-stored data, printing capacity, imaging ability, local authentication or authorization level, a combination thereof, or so forth. Examples of network features may include network bandwidth, wireless versus wireline, local area network (LAN) versus internet, remotely-relevant authentication or authorization level, access to remotely-stored data, access to shared or server storage, access to remotely-located or so-called cloud services, encrypted communication capacity, network latency, a combination thereof, or so forth. Capabilities and features of devices, whether native or network-based, may be considered services that are usable by end-users or other devices. Devices that are capable of wireless communication may learn to exchange information about, or actually share, services that are provided or directly-accessible by, or otherwise primarily associated with, a given device.

One example wireless network, among others, is a Neighbor Awareness Network (NAN). A NAN network is comprised of a set of NAN devices that operate under a common network identifier (NAN ID) and that share common synchronization (sync) frame and discovery window parameters, A NAN network generally includes one or more clusters of NAN devices (also referred to herein as "NAN cluster"). Each NAN cluster may be a contention group or beacon group and may be considered a local representation of a NAN network. A NAN cluster is comprised of a set of NAN devices that operate in a NAN network with one NAN ID and which are synchronized with respect to both the sync frame transmissions and the discovery windows. In order for NAN devices to form a NAN cluster, at least some of the NAN devices need to be within range of each other. The NAN ID is carried at least in synchronization frames that may be of a beacon frame format. Each beacon contains a NAN ID field that is used in a NAN device receiving a beacon, to determine, as an example, whether the beacon is from a NAN network in which the NAN device is operating and from what type of NAN network the beacon was transmitted.

Within a NAN network, a device may exchange via wireless network communication information about, or actually share, services that are provided or directly-accessible by, or otherwise primarily associated with, the device. By way of example only, NAN may enable a refrigerator to find a device offering internet access to enable the refrigerator to send an updated list of grocery items that need to be purchased by a home owner. As another example, NAN may enable a printer to advertise a capability to provide a hard copy of: (i) a grocery list for a refrigerator, (ii) a guide of available media options during a Friday evening viewing period for a smart television, (iii) a student's project for a school-issued laptop, or so forth. NAN may include, but is not limited to, so-called "Wi-Fi Aware" technology of the Wi-Fi Alliance, a social announcement scheme to enable discovery or advertising of one or more services that may be shared between or among two or more wireless communication devices via at least one announcement operation or message, or combinations thereof. In one or more example embodiments as described herein, proximity-enhanced NAN technology may use, or may be implemented in conjunction with or in an environment involving, at least one communication protocol that is compliant with Wi-Fi networking, such as a network implementing or comporting with at least a portion of an IEEE 802.11 standard (e.g., as discussed in the IEEE Std. 802.11-2012, Mar. 29, 2012). Nevertheless, although reference may be made herein to an IEEE 802.11 standard or various aspects thereof (e.g., channels, frequencies, message or frame types, or protocol specifications), the techniques and approaches described herein may additionally or alternatively be implemented using one or more other (e.g., wireless) standards or signaling technologies.

As discussed above, devices that implement NAN may be organized into clusters. A NAN-implementing device may participate in one or more NAN clusters. A device may leave or move to or join a given cluster depending on preferences or current service desires of the device. NAN may provide a mechanism for devices to synchronize a time or a channel on which the devices converge to facilitate discovery of services that have been made discoverable by existing devices of a cluster or by new devices that enter a NAN environment. NAN devices may share a common set of NAN parameters, such as: a time duration of a Discovery Window (DW), a time period between consecutive Discovery Windows, a beacon interval, NAN Channel(s), combinations thereof, or so forth. Depending on changes to a NAN cluster, including but not limited to changes in which NAN devices are part of a NAN cluster or which NAN devices have what master ranks, different NAN devices may be elected to act as or to become a master device (e.g., a NAN device having a master role) at varying times.

In other words, possession of, or election to, a master role with respect to a given wireless communication device may change from time to time. Determination of a master role may be based on one or more of many potential factors. Example factors may include, but are not limited to, a possible or allowed transmission power, an available power source (e.g., battery, grid, or remaining battery percentage or time), received signal strength, NAN-related protocol version number under which a device is operating (e.g., whether a given device can interact with other devices so as to provide latest capabilities), number of other devices that a given device can directly communicate with—such as number of one-hop neighbors, average number of hops for a given device to reach each device that is currently or potentially part of a cluster, number of service(s) that a given device directly (or indirectly) provides, popularity of service(s) that a given device directly (or indirectly) provides, percentage of time that a given device can be available to interact with or provide NAN-related functionality, distance to another wireless communication device in a same cluster, distance to another wireless communication device in a different cluster, access to an accurate time source, accuracy level of an associated time source, or a combination thereof.

Figure 3:
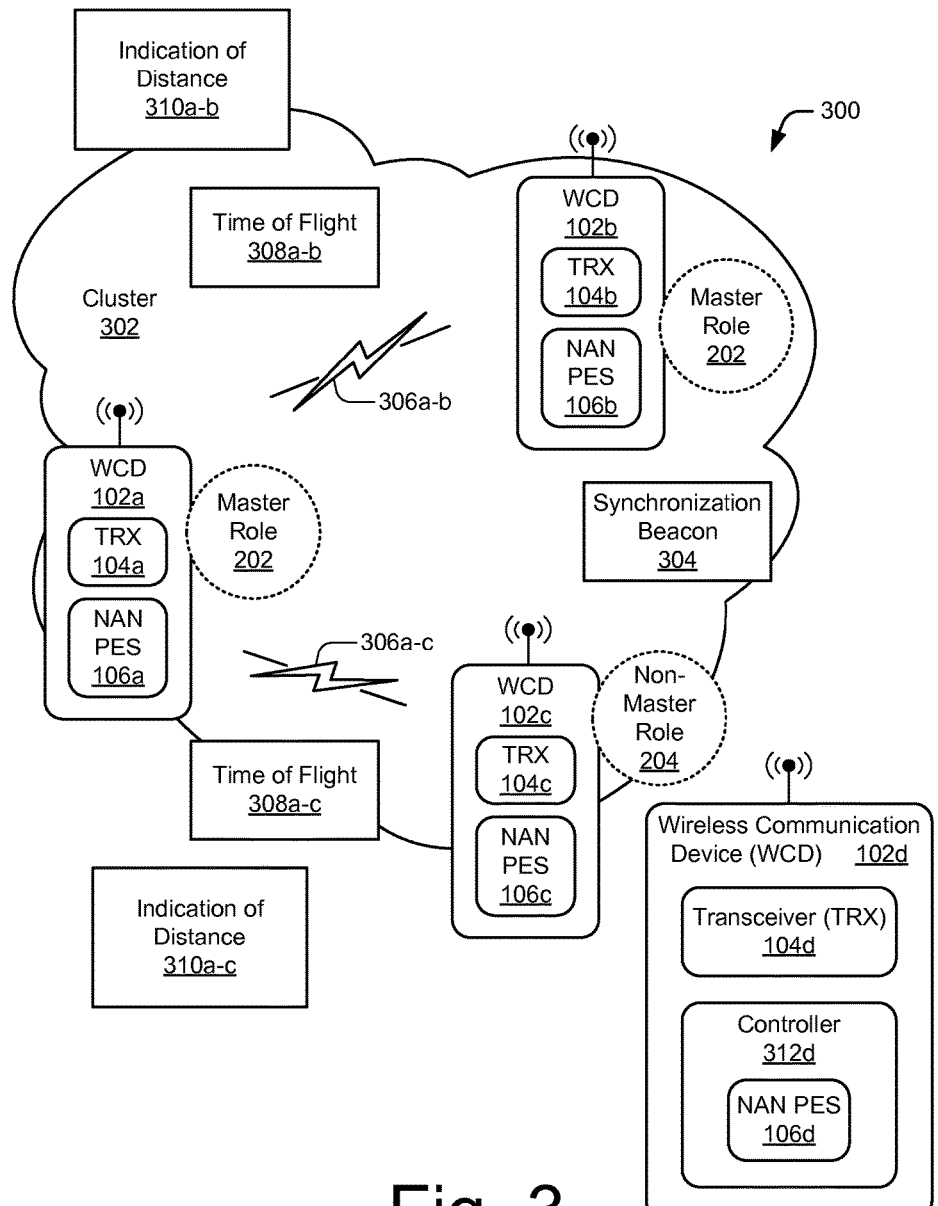
FIG. 3 depicts a cluster of wireless communication devices in which beaconing within a wireless network based on an indication of distance is implemented such that a master role may be determined using an indication of distance in accordance with one or more example embodiments.
Figures 1, 4:
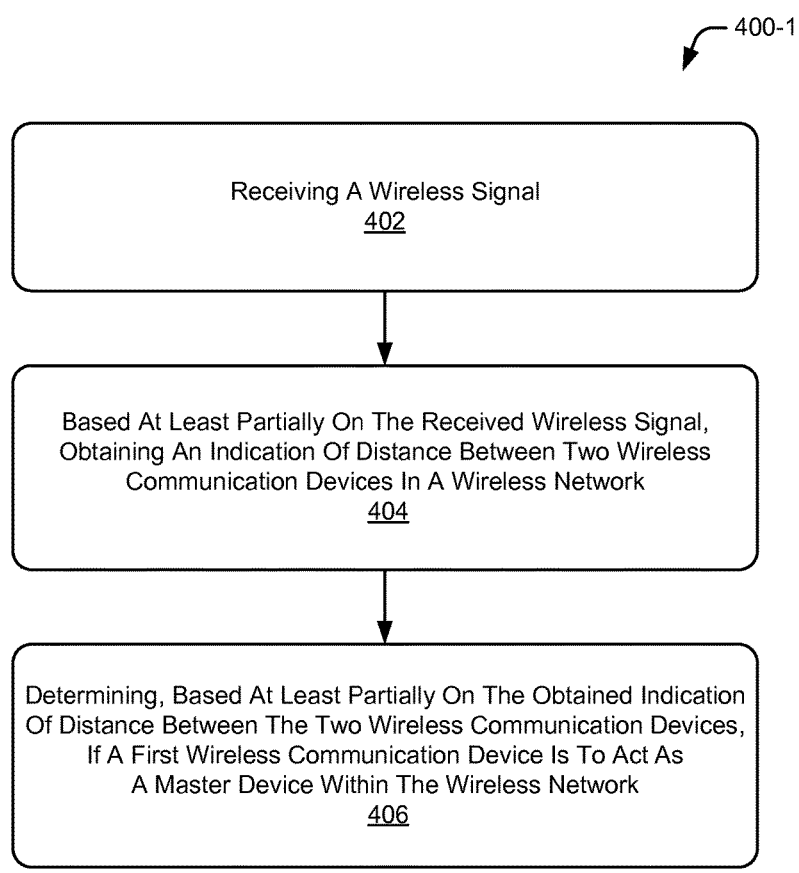
Figures 2, 4:
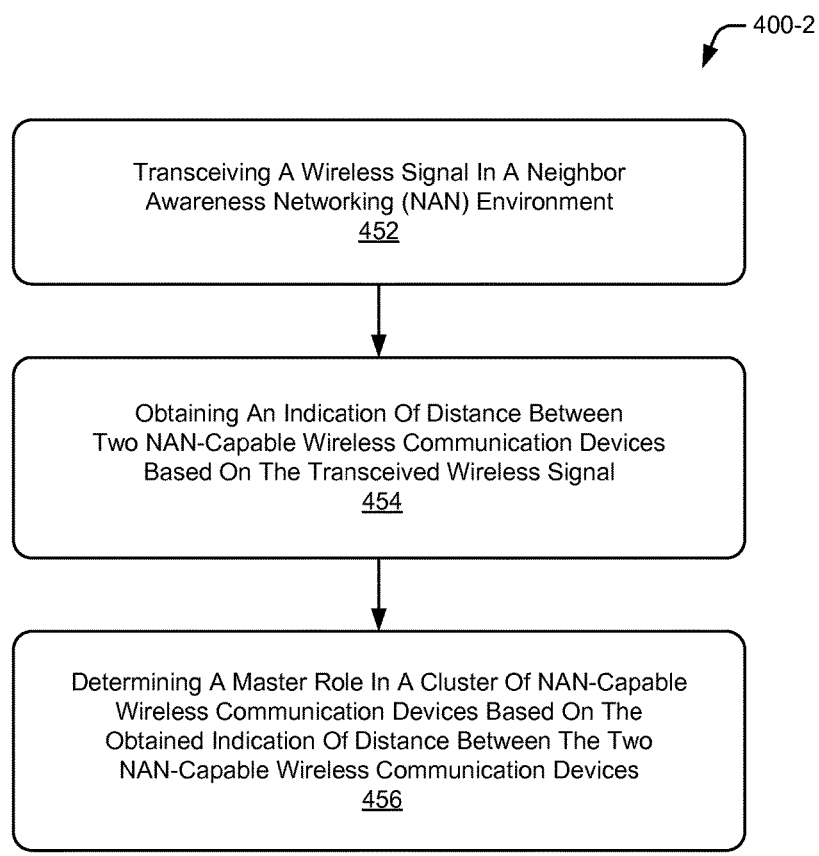

For certain example embodiments, different implementations or aspects of incorporating distance as a factor to determine a master role in a cluster of wireless communication devices are described herein. By way of example only, a master role in a cluster of NAN-capable wireless communication devices may be determined based at least partially on an indication of distance between two NAN-capable wireless communication devices. Example wireless communication devices for a NAN cluster are described herein below with particular reference to FIG. 1. Example master and non-master roles for wireless communication devices in a NAN environment are described herein below with particular reference to FIG. 2. FIGS. 3 and 4 are, respectively, a schematic diagram and a flow diagram that pertain to beaconing within a wireless network based on an indication of distance, and they are described to include an indication of distance between two, e.g. NAN-capable, wireless communication devices with regard to master role determination. First through fourth example aspects of NAN proximity-based enhancement are described herein below with particular reference to FIGS. 5-8, respectively. FIG. 9 is described to include different example components for an embodiment of a wireless communication device.

FIG. 1 depicts an example neighbor awareness networking (NAN) environment 100 that includes wireless communication devices 102 for which methods and apparatus for beaconing within a wireless network based on an indication of distance may be implemented in accordance with one or more example embodiments. As illustrated, example NAN environment 100 includes multiple wireless communication devices (WCDs) 102, each of which may include at least one transceiver (TRX) 104 and at least one NAN proximity-based enhancement system (PES) 106.

As shown, there are four wireless communication devices 102a, 102b, 102c, and 102d. A wireless communication device 102a may include at least a transceiver 104a and a NAN proximity-based enhancement system 106a. A wireless communication device 102b may include at least a transceiver 104b and a NAN proximity-based enhancement system 106b. A wireless communication device 102c may include at least a transceiver 104c and a NAN proximity-based enhancement system 106c. And a wireless communication device 102d may include at least a transceiver 104d and a NAN proximity-based enhancement system 106d. An example of a device having various components is described herein below with particular reference to FIG. 9. Although four wireless communication devices 102 are specifically shown by way of example in FIG. 1, one, two, three or more wireless communication devices 102 may generally operate in a NAN environment 100 to facilitate NAN proximity-based enhancement.

For certain example embodiments, NAN proximity-based enhancement functionality may be distributed between or among one or more wireless communication devices 102, such as wireless communication devices 102a, 102b, 102c, or 102d. Different one(s) of wireless communication devices 102 may perform particular shared functionality individually or jointly at various times. Descriptions herein generally relate to functionality being distributed among each of wireless communication devices 102a, 102b, 102c, and 102d. Alternatively, in some situations functionality may be distributed between or among certain wireless communication device(s) 102 but omitted from or latent in other ones (e.g., included in ones with a recent protocol version or with a current role of master but omitted from ones with an older protocol version or latent in ones without a current role of master).

For certain example implementations, a transceiver 104 may include a transmitter, a receiver, both a transmitter and a receiver, logic to operate a transmitter or receiver in accordance with (e.g., one or more physical, data link, or network layers of) at least one wireless standard for propagating signals, a receiver chain, a frequency converter, a filter, some combination thereof, or so forth. A wireless communication device 102 may be capable of transmitting a wireless signal, receiving a wireless signal, both transmitting and receiving wireless signals, or some combination thereof using a transceiver 104 via at least one wireless channel. A NAN proximity-based enhancement system 106 may be configured to process (e.g., interpret, decode, formulate, generate, calculate values based on, respond to, or a combination thereof) signals that have been received or that are to be transmitted via a transceiver 104, including but not limited to those signals that facilitate or otherwise pertain to a NAN proximity-based enhancement scheme. For certain example embodiments, as described further herein, a NAN proximity-based enhancement system 106 may use one or more transmitted or received signals to enhance a NAN environment at least partially based on at least one indication of distance between at least two NAN-capable wireless communication devices.

Figure 2:
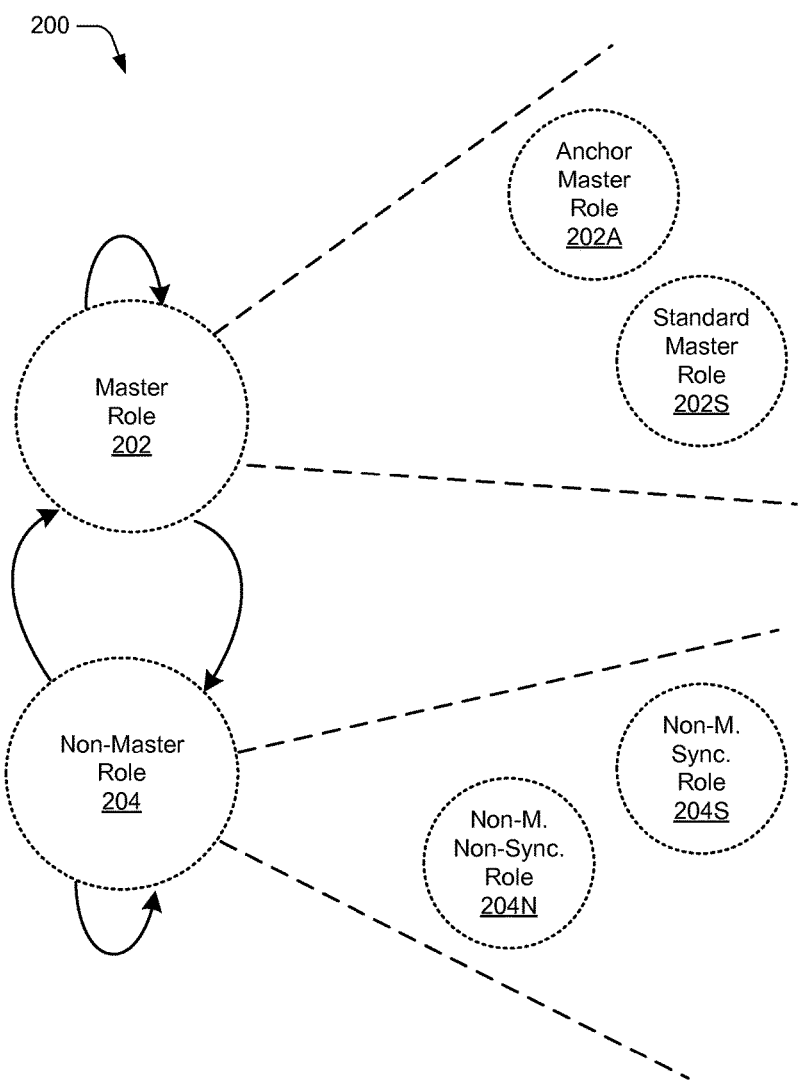
FIG. 2 illustrates a state diagram that represents an example relationship between a master role and a non-master role for wireless communication devices in accordance with one or more example embodiments.

FIG. 2 illustrates a state diagram 200 that represents an example relationship between a master role 202 and a non-master role 204 for wireless communication devices 102 (not shown in FIG. 2) in accordance with one or more example embodiments. As illustrated, state diagram 200 includes a master role 202 and a non-master role 204. A master role 202 may correspond to, by way of example but not limitation, an anchor master role 202A or a standard master role 202S. A non-master role 204 may correspond to, by way of example but not limitation, a non-master synchronization (non-m. sync.) role 204S or a non-master non-synchronization (non-m. non-sync.) role 204N. Although two general roles and four specific roles are shown in state diagram 200 and described herein below, NAN proximity-based enhancement embodiments may be implemented in environments having a different number of general or specific roles.

For certain example environments, a role that is associated with a wireless communication device may control (or at least affect) which one or more beacon types, if any, the wireless communication device (i) is permitted to generate or transmit or (ii) is responsible for generating or transmitting. Two example types of beacons are discovery beacons and synchronization beacons. A discovery beacon may be used to announce (e.g., advertise or discover) services that are made available by or desired by one or more wireless communication devices of a given cluster. A synchronization beacon may be used to distribute a time indication between or among various wireless communication devices to facilitate synchronization. A wireless communication device having a master role 202 (e.g., an anchor master role 202A or a standard master role 202S) may have an authority or a responsibility to transmit a discovery beacon or a synchronization beacon for a cluster of wireless communication devices. An anchor master role 202A, in particular, may further entail an authority or a responsibility to establish a synchronization time for a cluster. A wireless communication device having a non-master synchronization role 204S may have an authority or a responsibility to transmit a synchronization beacon but not a discovery beacon for a cluster. And a wireless communication device having a non-master non-synchronization role 204N may lack an authority/responsibility to transmit either a synchronization beacon or a discovery beacon. FIGS. 1 and 2 and certain other example embodiments are described herein primarily in terms of a NAN environment. However, principles descried herein are applicable at least to wireless networks generally that transmit beacons.

FIG. 3 depicts a schematic diagram 300 of a cluster 302 of wireless communication devices 102 in which beaconing within a wireless network based on an indication of distance is implemented such that a master role 202 may be determined using an indication of distance 310 in accordance with one or more example embodiments. As illustrated, schematic diagram 300 depicts a cluster 302 that includes wireless communication devices 102a, 102b, and 102c. Cluster 302 may or may not also include wireless communication device 102d. As described hereinabove with particular reference to FIG. 1, a respective wireless communication device (WCD) 102a, 102b, 102c, or 102d (with wireless communication device 102d also being shown in FIG. 3) may include a respective transceiver (TRX) 104a, 104b, 104c, or 104d as well as a respective NAN proximity-based enhancement system (PES) 106a, 106b, 106c, or 106d. As illustrated, schematic diagram 300 further depicts at least one master role 202, at least one synchronization beacon 304, at least one wireless signal 306, at least one time of flight 308, at least one indication of distance 310, or at least one controller 312d at wireless communication device 102d. Although not explicitly shown in FIG. 3, a controller may also be implemented at any of wireless communication devices 102a, 102b, and 102c. For certain example embodiments, a controller 312d may be configured to determine a master role 202 in a wireless network generally based at least partially on at least one indication of distance 310.

For certain example embodiments, a synchronization beacon 304 may be transmitted (e.g., sent point-to-point, broadcast, targeted, or a combination thereof) from at least one wireless communication device 102 to one or more other wireless communication devices 102 of cluster 302. A synchronization beacon 304 may enable a cluster of devices to synchronize their individual local clock times to facilitate a cluster-wide time reference. Synchronization beacon 304 may be transmitted in accordance with a role associated with each wireless communication device 102 as described herein above with particular reference to FIG. 2. As shown, wireless communication devices 102a and 102b have a master role 202, and wireless communication device 102c has a non-master role 204. However, wireless communication devices 102a, 102b, and 102c may alternatively be associated with different roles.

For certain example embodiments, a wireless signal may be propagated between a first and a second (e.g., transmitted by one and received by another) wireless communication device. For instance, wireless signal 306a-b may be transmitted between wireless communication device 102a and wireless communication device 102b. In an 802.11 environment, for example, a wireless signal 306 may comprise or may carry or may be part of at least one frame (e.g., an action frame, a management frame, a beacon frame, or a combination thereof). With synchronized times between two devices, a time of flight 308a-b may be calculated based at least partly on wireless signal 306a-b using a time of departure from one device and a time of arrival at another device. Given a speed of travel of wireless signal 306a-b (e.g., a speed of an electromagnetic wave in an air medium, which may or may not be adjusted for intervening barrier(s), ambient humidity, frequency of the wave, etc.) and time of flight 308a-b, an indication of distance 310a-b may be generated. Indication of distance 310a-b may represent a distance between wireless communication device 102a and wireless communication device 102b. An indication of distance 310a-b may be expressed in a unit of spatial measurement, such as centimeters, meters, feet, or so forth. Additionally or alternatively, because one depends on the other or may be obtained from the other, an indication of distance 310 may comprise a time of flight 308, or a time of flight 308 may comprise a signal initiation time and a signal reception time. Also or instead of a spatial measurement, an indication of distance 310a-b may comprise a range of spatial measurements, such as 10-12 feet or 450+/−10 cm (e.g., to reflect a margin of error or uncertainty in a spatial measurement or an underlying time of flight or temporal synchronization).

Wireless signal 306a-b, time of flight 308a-b, and indication of distance 310a-b pertain to a communication between wireless communication device 102b and wireless communication device 102a, both of which are shown to have master roles 202. Additionally or alternatively, such a signal, a time, or an indication may pertain to a communication between a device having a master role 202 and a device having a non-master role 204. For example, wireless signal 306a-c may be transmitted between wireless communication device 102c, which is associated with a non-master role 204, and wireless communication device 102a, which is associated with a master role 202. Using a departure and an arrival time of wireless signal 306a-c, wireless communication device 102a or wireless communication device 102c may calculate a time of flight 308a-c. From time of flight 308a-c, wireless communication device 102a or wireless communication device 102c may generate an indication of distance 310a-c. Although not explicitly shown in FIG. 3, such a signal, a time, or an indication may additionally or alternatively pertain to a communication between two wireless communication devices that both have a non-master role 204.

An example approach to generating a distance between two wireless communication devices is Wireless Location Services (WLS), which is a burgeoning 802.11 protocol. With WLS, but by way of example only, a client station (STA) and an access point (AP) may send management frames to each other and record a time at which the frames were sent and received. A time of flight (ToF) of at least one frame of one or more exchanged frames may be calculated from recorded timestamp data. A distance indication between a client station and an access point may be generated using a time of flight of one or more exchanged frames. A distance indication may be accurate, for instance, to within approximately three (3) centimeters (cm). Although not explicitly shown in FIG. 3, an indication of distance may additionally or alternatively be generated using one or more or other separate or combined techniques, including but not limited to computing a distance between two devices having known, or at least determinable, absolute locations.

For certain example embodiments, a first wireless communication device (e.g., wireless communication device 102a or 102c) may include a transceiver (e.g., a transceiver 104a or 104c, respectively) that is configured to transceive (e.g., transmit or receive) at least one wireless signal (e.g., wireless signal 306a-b or wireless signal 306a-c) and a NAN proximity-based enhancement system (e.g., NAN proximity-based enhancement system 106a or 106c). A NAN proximity-based enhancement system (e.g., NAN proximity-based enhancement system 106a or 106c) may be configured to (i) obtain (e.g., (a) compute through one or more calculations or signal measurements or (b) receive a communication having) at least one indication of distance (e.g., indication of distance 310a-b or 310a-c) between two NAN-capable wireless communication devices (e.g., wireless communication device 102a, 102b, 102c, or 102d, which may or may not include the first wireless communication device that performs the obtaining) based at least partially on at least one transceived wireless signal (e.g., wireless signal 306a-b or wireless signal 306a-c) and (ii) determine (e.g., elect, become associated with, relinquish possession of, agree to, designate for another, negotiate with another device to establish, ascertain assignment of, decide on, modify, or a combination thereof) at least one master role (e.g., master role 202) in a cluster (e.g., cluster 302) of NAN-capable wireless communication devices (e.g., wireless communication device 102a, 102b, 102c, or 102d) based at least partially on the obtained indication of distance (e.g., indication of distance 310a-b or 310a-c) between the two NAN-capable wireless communication devices (e.g., wireless communication device 102a, 102b, 102c, or 102d). Although not explicitly illustrated in FIG. 3 or described herein above with reference to FIG. 3, a first wireless communication device may determine a master role for the first wireless communication device or another wireless communication device based at least partly on an indication of distance between two wireless communication devices (e.g., which two wireless communication devices may include or may be different from either or both of the first wireless communication device or the other wireless communication device, if any, for which a master role is being determined).

FIG. 4-1 is a flowchart illustrating an example process 400-1 for beaconing within a wireless network based on an indication of distance in which acting as a master device may be determined using an indication of distance in accordance with one or more example embodiments. Process 400-1 is described in the form of a set of blocks 402-406 that specify operations that may be performed; however, operations are not necessarily limited to the order shown in FIG. 4-1 or described herein, for the operations may be implemented in alternative orders or in fully or partially overlapping manners. Operations represented by the set of blocks in process 400-1 may be performed by a wireless communication device 102, such as a wireless communication device 102a, 102b, 102c, or 102d (e.g., of at least FIG. 1 or 3) or a first wireless communication device 102(1) (e.g., of at least FIG. 5, 6, 7, or 8).

For certain example embodiments, a transceiver (e.g., a transceiver 104 of at least FIG. 1, 3, or 9) may at least partially perform operation(s) of block 402, and a controller (e.g., a controller 312d/312 of at least FIG. 3 or 9) may at least partially perform operation(s) of blocks 404 or 406. For a process 400-1, a first wireless communication device may determine, based on an indication of distance between two wireless communication devices, if the first wireless communication device is to act as a master device within a wireless network, wherein a master device is a device configured to transmit a beacon within the wireless network. At block 402, a wireless signal may be received. At block 404, based at least partially on the received wireless signal, an indication of distance between two wireless communication devices in the wireless network may be obtained. At block 406, based at least partially on the obtained indication of distance between the two wireless communication devices, it may be determined if the first wireless communication device is to act as a master device within the wireless network.

FIG. 4-2 is a flowchart illustrating an example process 400-2 for NAN proximity-based enhancement in which a master role in a cluster of wireless communication devices may be determined using an indication of distance in accordance with one or more example embodiments. Process 400-2 is described in the form of a set of blocks 452-456 that specify operations that may be performed; however, operations are not necessarily limited to the order shown in FIG. 4-2 or described herein, for the operations may be implemented in alternative orders or in fully or partially overlapping manners. Operations represented by the set of blocks in process 400-2 may be performed by a wireless communication device 102, such as a wireless communication device 102a, 102b, 102c, or 102d (e.g., of at least FIG. 1 or 3) or a first wireless communication device 102(1) (e.g., of at least FIG. 5, 6, 7, or 8).

For certain example embodiments, a transceiver (e.g., a transceiver 104 of at least FIG. 1, 3, or 9) may at least partially perform operation(s) of block 452, and a NAN proximity-based enhancement system (e.g., a NAN proximity-based enhancement system (PES) 106 of at least FIG. 1, 3, or 9) may at least partially perform operation(s) of blocks 454 or 456. At block 452, a wireless signal in a neighbor awareness networking (NAN) environment may be transceived. For example, a wireless communication device 102 may transceive (e.g., send, emanate from an antenna, demodulate, couple to or from a radio or antenna, detect via at least one antenna, accepting as an incoming, or a combination thereof) at least one wireless signal 306 (e.g., electromagnetic wave, message frame in accordance with a protocol, propagated packet, radio frequency (RF) signal, or a combination thereof) (e.g., with respect to at least one other wireless communication device 102) in a communication environment in which two or more wireless communication devices exchange information about, or actually share, services that are provided or directly-accessible by, or otherwise primarily associated with, a given device.

At block 454, an indication of distance between two NAN-capable wireless communication devices may be obtained based at least partially on a transceived wireless signal. For example, a wireless communication device 102 may obtain (e.g., compute using measured or received data, calculate responsive to a constant or timestamp data, receive from another device, or a combination thereof) an indication of distance 310 (e.g., spatial measurement, length of travel, time of flight, set of departure and arrival timestamps, category with a determinable mapping to a distance—such as a category "C" that maps to 3-7 meters, range in feet, or a combination thereof) between two NAN-capable wireless communication devices (e.g., wireless communication devices 102a, 102b, 102c, or 102d, etc.—which may or may not include a wireless communication device 102 that is performing an obtaining operation—that are configured to participate in at least some NAN-related functionality) at least partially based on (e.g., using, responsive to, extracted from, derived from data associated with, or combination thereof) at least one transceived wireless signal 306.

At block 456, a master role in a cluster of NAN-capable wireless communication devices may be determined based at least partially on an obtained indication of distance between two NAN-capable wireless communication devices. For example, a wireless communication device 102 may determine (e.g., elect, become associated with, relinquish possession of, agree to, designate for another, negotiate with another device to establish, ascertain assignment of, decide on, modify, or a combination thereof) a master role 202 (e.g., role having elevated rights or privilege, designation permitting a device to transmit discovery beacons or synchronization beacons, a position enabling a device to become elevated to an anchor master role, or a combination thereof) in a cluster 302 of (e.g., group of, set of synchronized, self-organized collection of, or a combination thereof) NAN-capable wireless communication devices (e.g., wireless communication device 102a, 102b, 102c, or 102d, etc.—which may or may not include a wireless communication device 102 that is performing a determining operation—that are configured to participate in at least some NAN-related functionality) at least partially based on (e.g., using, responsive to, considering, dependent on, having as an input to an algorithm, or a combination thereof) an obtained indication of distance 310 (e.g., spatial measurement, length of travel, time of flight, pair of departure and arrival timestamps, category with a determinable mapping to a distance—such as a category "delta" that maps to range of 10-15 feet, range in centimeters, or a combination thereof) between two NAN-capable wireless communication devices (e.g., wireless communication device 102a, 102b, 102c, or 102d, etc.—which may or may not include a wireless communication device 102 that is performing a determining operation).

FIGS. 5-8 depict different example aspects of how distance may be incorporated into a master role determination. More specifically, but by way of example only, various distances between two or more different wireless communication devices may impact a decision a given wireless communication device makes with respect to keeping a master role, relinquishing a master role, sharing a master role within a cluster, assigning a master role to another, electing to join a particular cluster having a master device, ascertaining when to attempt to elect a new master, modifying a master role (e.g., switching between an anchor master role and a non-anchor, or standard, master role), or a combination thereof. Any given first, second, third, or fourth wireless communication device 102(1), 102(2), 102(3), or 102(4), respectively, (e.g., of FIG. 5, 6, 7, or 8) may correspond to any particular wireless communication device 102a, 102b, 102c, or 102d (e.g., of FIG. 1 or 3) depending on situation, current scenario, or combination thereof.

Figure 5:
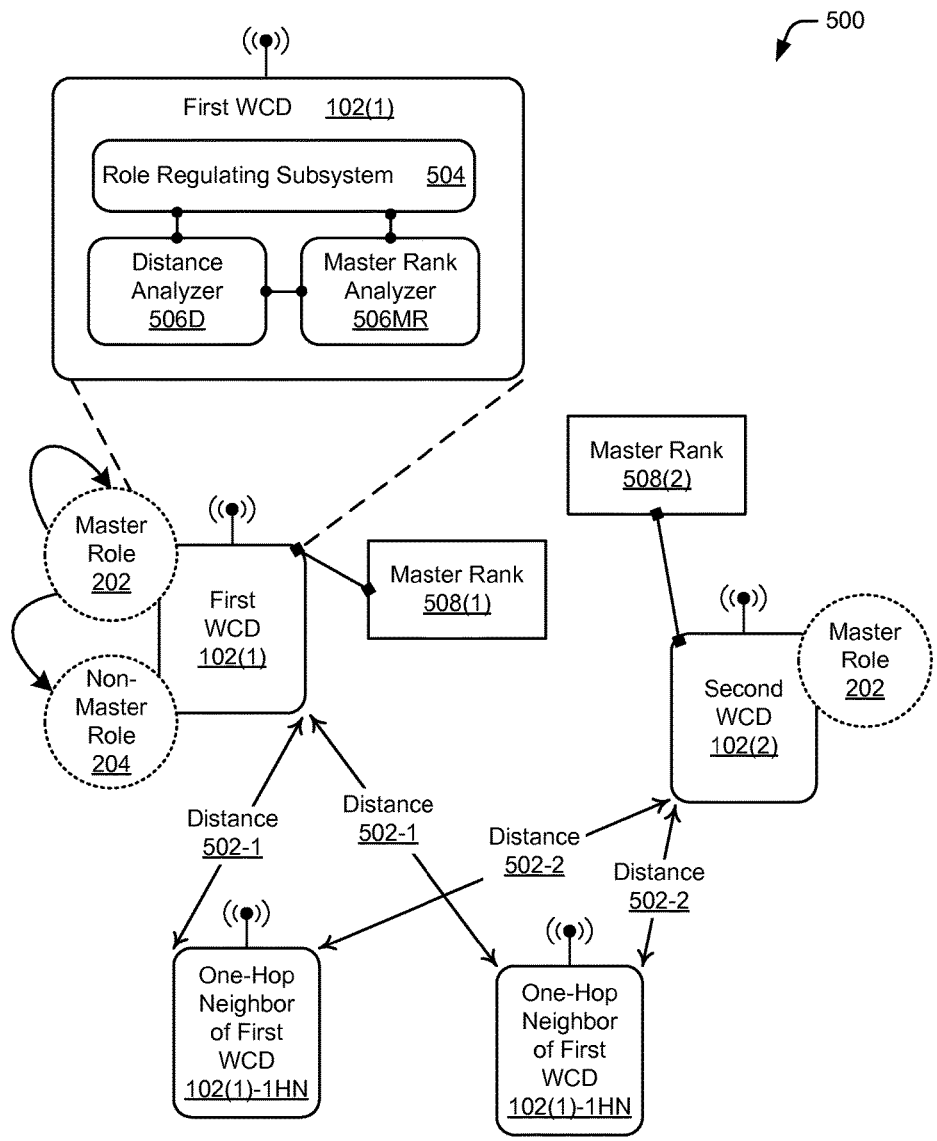
FIG. 5 depicts an example arrangement of wireless communication devices that illustrates first aspects of NAN proximity-based enhancement in accordance with one or more example embodiments.

FIG. 5 depicts an example arrangement 500 of wireless communication devices 102 that illustrates first aspects of NAN proximity-based enhancement in accordance with one or more example embodiments. As illustrated, arrangement 500 includes a first wireless communication device (WCD) 102(1), a second wireless communication device 102(2), multiple one-hop neighbors of first WCD 102(1)-1HN, a master role 202, a non-master role 204, multiple distances 502, and multiple master ranks 508. First wireless communication device 102(1) may include a role regulating subsystem 504, a distance analyzer 506D, or a master rank analyzer 506MR. Although not explicitly shown in FIG. 5, role regulating subsystem 504, distance analyzer 506D, or master rank analyzer 506MR may be realized as at least part of a NAN proximity-based enhancement system 106 (e.g., of FIG. 1, 3, or 9).

For certain example embodiments, role regulating subsystem 504 may determine a master role (e.g., switch a role, activate a role, maintain a role, relinquish a role, or a combination thereof) at least partially based on at least one distance 502 or at least one master rank 508. Distance analyzer 506D may obtain, compare, refine, or otherwise analyze one or more distances 502. Master rank analyzer 506MR may obtain, compare, weigh, or otherwise analyze one or more master ranks 508. A master rank 508 may reflect a relative preference of each wireless communication device to transmit one or more beacons for a cluster.

With example arrangement 500, a first master rank 508(1) may correspond to first wireless communication device 102(1), or a second master rank 508(2) may correspond to second wireless communication device 102(2). Distances 502-1 represent distances between first wireless communication device 102(1) and one or more of its one-hop neighbors, which are designated one-hop neighbors of first WCD 102(1)-1HN. Distances 502-2 represent distances between second wireless communication device 102(2) and one or more of one-hop neighbors of first WCD 102(1)-1HN. Although two one-hop neighbors of first WCD 102(1)-1HN are explicitly shown, more or fewer one-hop neighbors of first WCD 102(1)-1HN may alternatively be analyzed by distance analyzer 506D.

For certain example embodiments, first wireless communication device 102(1) may be associated with a master role 202, and second wireless communication device 102(2) may be associated with a master role 202. In an example operation, role regulating subsystem 504 may determine if first wireless communication device 102(1) maintains a master role 202 (e.g., as represented by an arrow that emanates from and returns to the master role 202) or relinquishes a master role 202 and selects or falls back to a non-master role 204 (e.g., as represented by an arrow that emanates from master role 202 and terminates on non-master role 204).

Role regulating subsystem 504 may make a master role determination at least partially based on one or more distances 502 or master ranks 508. By way of example but not limitation, role regulating subsystem 504 may change a role associated with first wireless communication device 102(1) from master role 202 to non-master role 204 if: (i) there is another device, such as second wireless communication device 102(2), that has a master rank 508(2) higher than or equal to master rank 508(1), which corresponds to first wireless communication device 102(1); or (ii) one or more distances 502-2 between second wireless communication device 102(2) and one or more one-hop neighbors of first WCD 102(1)-1HN are less than one or more distances 502-1 between first wireless communication device 102(1) and one or more one-hop neighbors of first WCD 102(1)-1HN.

For certain example implementations, such as those relating to "Wi-Fi Aware" technology, distances 502 may be obtained, at least partly, by having other master devices, such as second wireless communication device 102(2), perform WLS ranging with one-hop neighbors of first WCD 102(1)-1HN. Ranging may be performed after a discovery window. Devices that support WLS may stay awake after a discovery window to perform ranging. Distances 502 that are considered by role regulating subsystem 504 may include an average of distances (e.g., mean, media, mode (if batched into categories), or a combination thereof), a maximum distance or distances, a minimum distance or distances, a sum or other function of two identifiable distances—such as a maximum and a minimum of each of distances 502-1 and distances 502-2, a combination thereof, or so forth.

Figure 6:
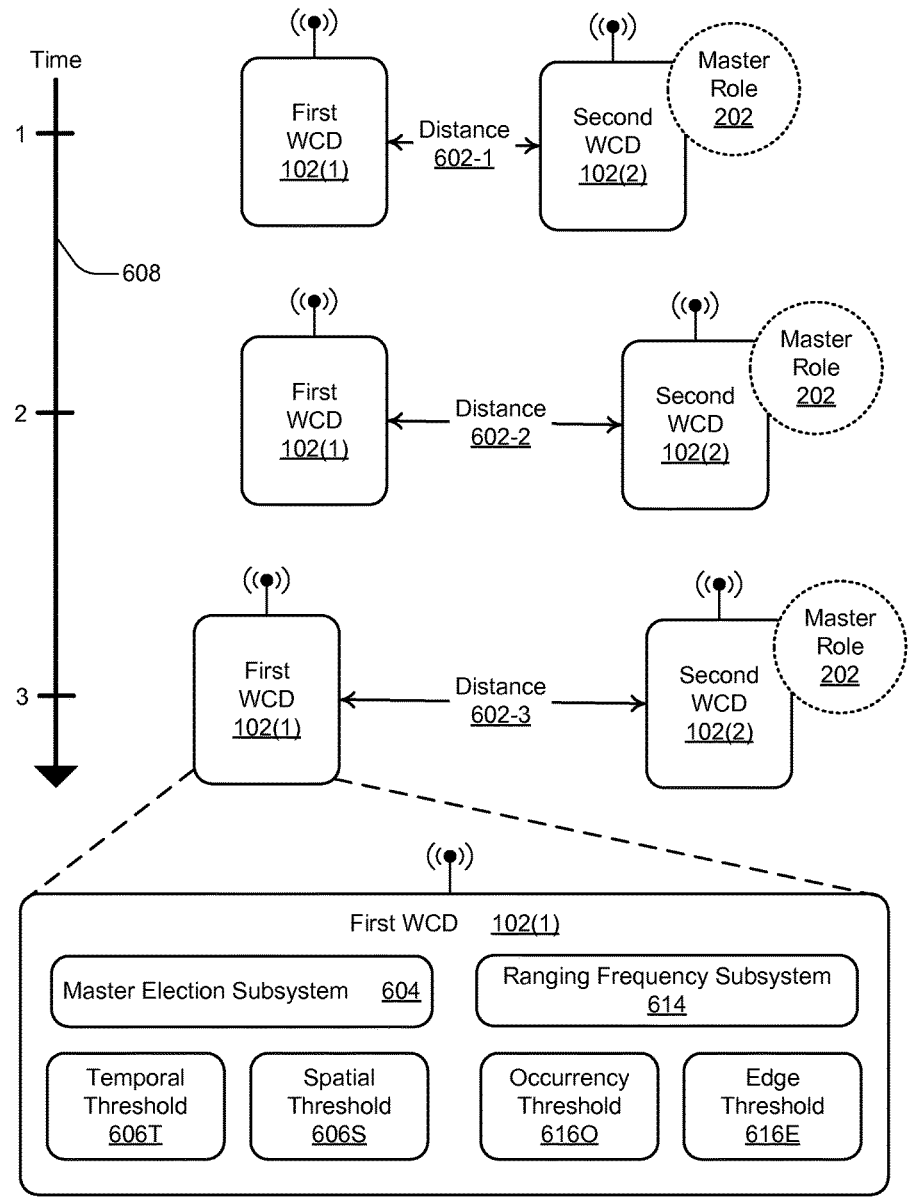
FIG. 6 depicts an example arrangement of wireless communication devices that illustrates second aspects of NAN proximity-based enhancement in accordance with one or more example embodiments.

FIG. 6 depicts an example arrangement 600 of wireless communication devices 102 that illustrates second aspects of NAN proximity-based enhancement in accordance with one or more example embodiments. As illustrated, arrangement 600 includes a first wireless communication device (WCD) 102(1), a second wireless communication device 102(2), a master role 202, multiple distances 602, and a time axis 608. First wireless communication device 102(1) may include: a master election subsystem 604, a temporal threshold 606T, or a spatial threshold 606S; or a ranging frequency subsystem 614, an occurrency threshold 616O, or an edge threshold 616E. Although not explicitly shown in FIG. 6, master election subsystem 604, temporal threshold 606T, spatial threshold 606S, ranging frequency subsystem 614, occurrency threshold 616O, or edge threshold 616E may be realized as at least part of a NAN proximity-based enhancement system 106 (e.g., of FIG. 1, 3, or 9).

As shown, by way of example only, a master role 202 may be associated with second wireless communication device 102(2). Although not shown explicitly in FIG. 6, master role 202 may comprise an anchor master role 202A or a standard master role 202S (e.g., as depicted in FIG. 2). First wireless communication device 102(1) is separated from second wireless communication device 102(2) by a distance 602. Time axis 608 indicates that time increases in a downward direction from a first time ("1"), to a second time ("2"), and to a third time ("3"). The time indexes may correspond to elapsed periods, standardized time slots, equal time amounts, unequal time amounts, a combination thereof, or so forth. With reference to time axis 608, first wireless communication device 102(1) is separated from second wireless communication device 102(2) by a distance 602-1, a distance 602-2, and a distance 602-3 at time indexes "1," "2," and "3," respectively. Although distances 602-1, 602-2, and 602-3 are shown as increasing as time elapses, they may alternatively be decreasing, remaining constant, fluctuating up and down (e.g., increasing and decreasing across different time indexes), or a combination thereof, or so forth.

For certain example embodiments, a master election subsystem 604 may determine a master role by deciding to execute a master election procedure at least partially based on a temporal threshold 606T or a spatial threshold 606S. In an example operation, if distance 602 between first and second wireless communication devices 102(1) and 102(2) (i) is increasing for a time period that equals (including equals or exceeds) temporal threshold 606T or (ii) is increasing to a distance that equals (including equals or exceeds) spatial threshold 606S, first wireless communication device 102(1) may initiate a master election algorithm to thereby attempt to switch to another cluster. More generally, master election subsystem 604 may ascertain if a distance 602 comports with (e.g., matches, is greater than, is less than, is greater than or equal to, is less than or equal to, triggers a comparison including, or a combination thereof) a temporal threshold 606T or a spatial threshold 606S in order to make a master election decision. A master election decision may be made, by way of example but not limitation, in accordance with a leader election algorithm for a mobile or wireless network, and a master election decision process may incorporate a master rank value as at least one factor of the master election decision.

For certain example embodiments, a ranging frequency subsystem 614 may operate to adjust a frequency at which ranging (e.g., one or more distance obtaining actions, such as time signal propagation, timestamp acquisition, time of flight calculation, or indication of distance computation) are performed at least partially based on an occurrency threshold 616O or an edge threshold 616E. In an example operation, a ranging frequency may be decreased or set to a relatively lower level if changes to distance 602 occur at less than an occurrency threshold 616O (e.g., at less than once per minute). In another example operation, a ranging frequency may be decreased or set to a relatively lower level if distance 602 is less than a first edge threshold 616E. On the other hand, a ranging frequency may be increased or set to a relatively higher level if distance 602 is greater than a same or a second, different edge threshold 616E. A second edge threshold 616E may be set so as to increase a ranging frequency if an anchor master reaches or approaches an edge of a communication range that is considered reliable (e.g., based on signal quality, throughput capability, latency, percentage of properly acknowledged transmissions, or a combination thereof). More generally, ranging frequency subsystem 614 may ascertain if a distance 602 or if changes to a distance 602 comports with (e.g., matches, is greater than, is less than, is greater than or equal to, is less than or equal to, triggers a comparison including, or a combination thereof) an occurrency threshold 616O or an edge threshold 616E in order to set or adjust a ranging frequency.

Figure 7:
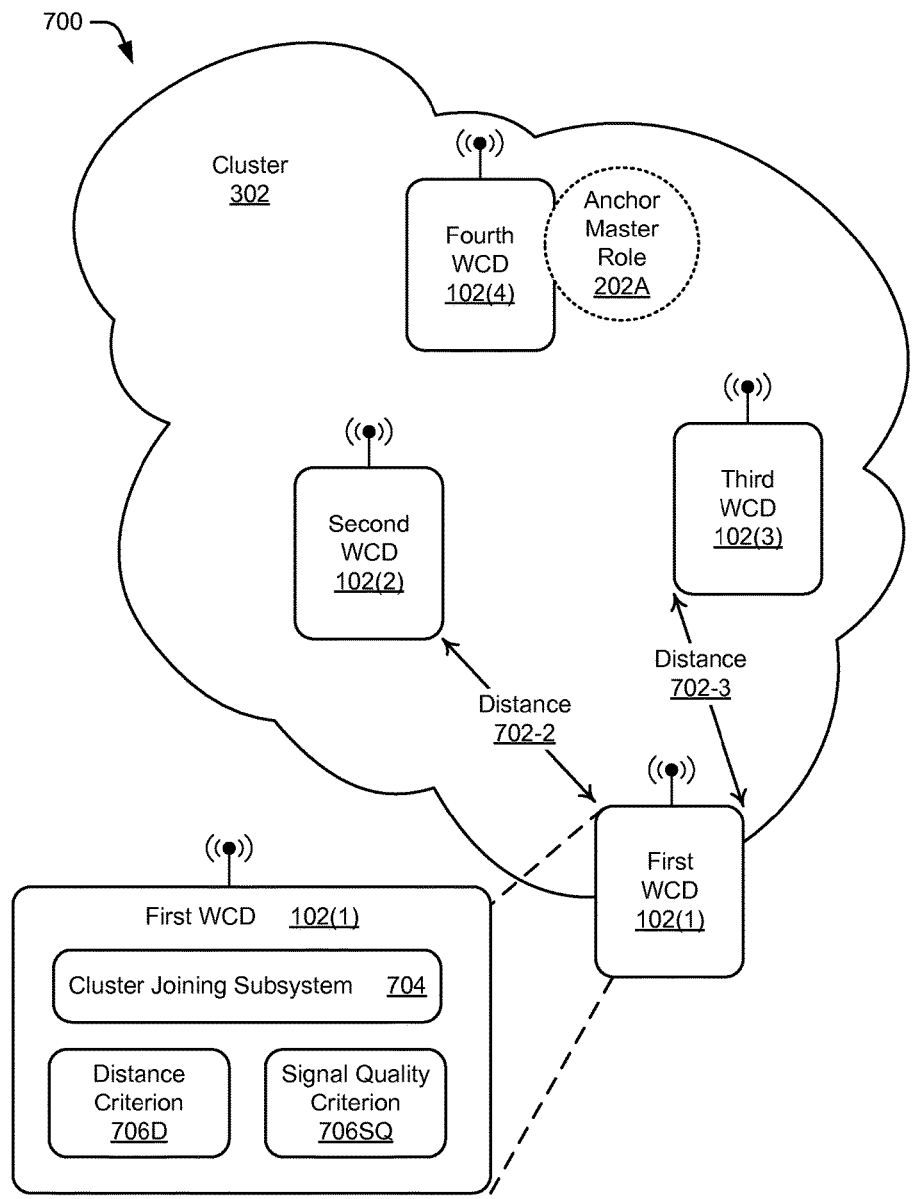
FIG. 7 depicts an example arrangement of wireless communication devices that illustrates third aspects of NAN proximity-based enhancement in accordance with one or more example embodiments.

FIG. 7 depicts an example arrangement 700 of wireless communication devices 102 that illustrates third aspects of NAN proximity-based enhancement in accordance with one or more example embodiments. As illustrated, arrangement 700 includes a cluster 302, a first wireless communication device (WCD) 102(1), a second wireless communication device 102(2), a third wireless communication device 102(3), a fourth wireless communication device 102(4), an anchor master role 202A, and multiple distances 702. First wireless communication device 102(1) may include a cluster joining subsystem 704, a distance criterion 706D, or a signal quality criterion 706SQ. Although not explicitly shown in FIG. 7, cluster joining subsystem 704, distance criterion 706D, or signal quality criterion 706SQ may be realized as at least part of a NAN proximity-based enhancement system 106 (e.g., of FIG. 1, 3, or 9).

For certain example embodiments, a cluster joining subsystem 704 may determine a master role by deciding whether or how to join a cluster with a pre-existing anchor master at least partially based on at least one distance criterion 706D or at least one signal quality criterion 706SQ. With example arrangement 700, anchor master role 202A of cluster 302 may be associated with fourth wireless communication device 102(4). Distances 702 may represent distances between first wireless communication device 102(1), which wants to join a particular cluster—such as cluster 302, and wireless communication devices 102 that are already part of a particular cluster—such as wireless communication devices 102(2) and 102(3). More specifically, but by way of example only, distance 702-2 may represent a distance between first wireless communication device 102(1) and second wireless communication device 102(2), and distance 702-3 may represent a distance between first wireless communication device 102(1) and third wireless communication device 102(3). First wireless communication device 102(1) may acquire information about anchor master 202A from second wireless communication device 102(2) or third wireless communication device 102(3).

For certain example embodiments, first wireless communication device 102(1) may be intending to join cluster 302, which has fourth wireless communication device 102(4) as anchor master, as a next hop of either second wireless communication device 102(2) or third wireless communication device 102(3). Cluster joining subsystem 704 of first wireless communication device 102(1) may join cluster 302, and thereby determine to accede to an anchor master role 202A of fourth wireless communication device 102(4), by deciding between second wireless communication device 102(2) or third wireless communication device 102(3) at least partially based on a distance criterion 706D, such as a comparison between distance 702-2 and distance 702-3. For instance, cluster joining subsystem 704 may select to join cluster 302 via a device to which it is closer or closest (e.g., has a shorter or shortest distance 702 there between). Additionally or alternatively, cluster joining subsystem 704 of first wireless communication device 102(1) may decide between second wireless communication device 102(2) or third wireless communication device 102(3) at least partially based on signal quality criterion 706SQ, such as a comparison one or more types of signal quality indication (e.g., signal-to-noise ratio (SNR), received signal strength indicator (RSSI), required transmission power, bandwidth throughput in bits per second (bps), or a combination thereof). For instance, cluster joining subsystem 704 may select to join cluster 302 via a device with which it can communicate at a higher or highest signal quality.

Figure 8:
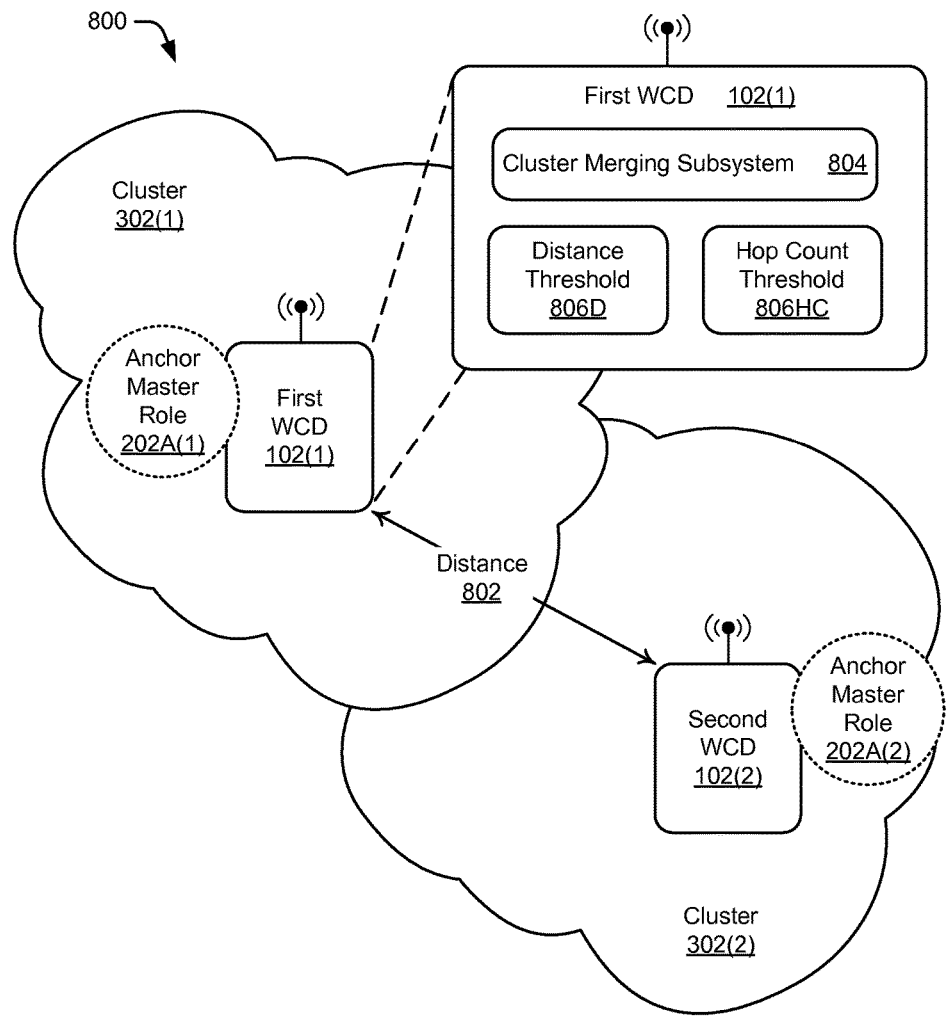
FIG. 8 depicts an example arrangement of wireless communication devices that illustrates fourth aspects of NAN proximity-based enhancement in accordance with one or more example embodiments.
Figure 9:
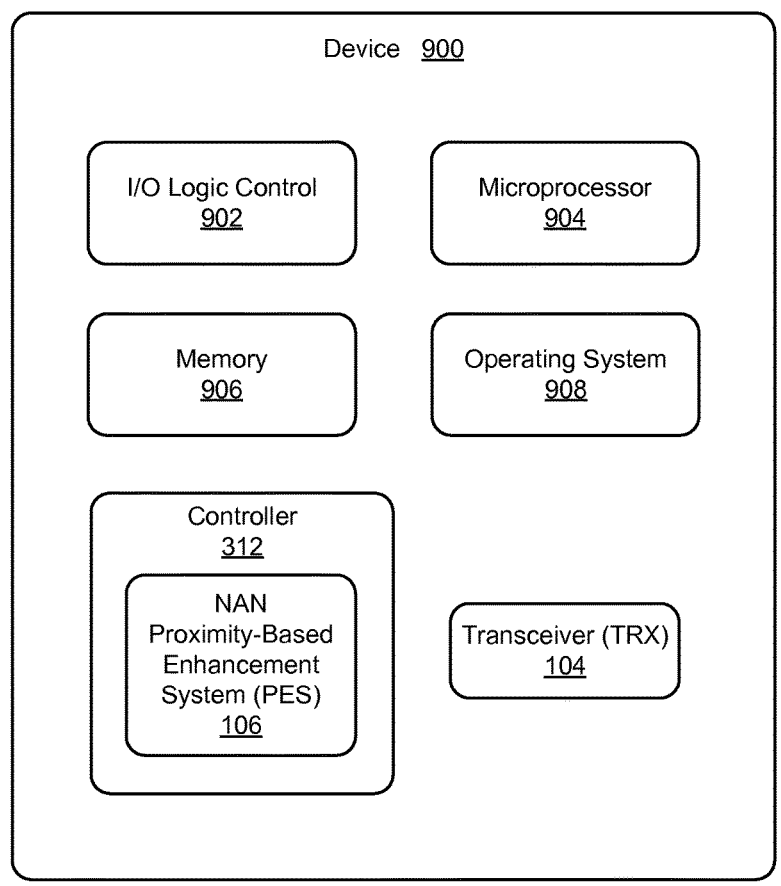
FIG. 9 depicts an example device that can implement various aspects of the mechanisms and processes described herein.

FIG. 8 depicts an example arrangement 800 of wireless communication devices 102 that illustrates fourth aspects of NAN proximity-based enhancement in accordance with one or more example embodiments. As illustrated, arrangement 800 includes a first cluster 302(1), a second cluster 302(2), a first wireless communication device (WCD) 102(1), a second wireless communication device 102(2), a first anchor master role 202A(1), a second anchor master role 202A(2), and a distance 802. First wireless communication device 102(1) may include a cluster merging subsystem 804, a distance threshold 806D, or a hop count threshold 806HC. Although not explicitly shown in FIG. 8, cluster merging subsystem 804, distance threshold 806D, or hop count threshold 806HC may be realized as at least part of a NAN proximity-based enhancement system 106 (e.g., of FIG. 1, 3, or 9).

For certain example embodiments, a cluster merging subsystem 804 may determine an anchor master role by deciding (i) whether two clusters should be merged or (ii) which device is to be associated with an anchor master role if two clusters are merged at least partially based on at least one distance threshold 806D or at least one hop count threshold 806HC. With example arrangement 800, first wireless communication device 102(1) may be associated with a first anchor master role 202A(1) for first cluster 302(1), and second wireless communication device 102(2) may be associated with a second anchor master role 202A(2) for second cluster 302(2). As shown, first wireless communication device 102(1) and second wireless communication device 102(2) are spanned by a distance 802.

For certain example embodiments, at least first wireless communication device 102(1) may determine to eliminate an anchor master role 202A (e.g., relinquish its own anchor master role 202A(1) status or request that second wireless communication device 102(2) relinquish its master role 202A(2) status) as part of a merging procedure of first cluster 302(1) and second cluster 302(2). By way of example only, cluster merging subsystem 804 may determine to have first and second clusters 302(1) and 302(2) merge if at least one of: (i) anchor masters of existing clusters move within a threshold distance of each other (e.g., if distance 802 between first and second wireless communication devices 102(1) and 102(2) having first and second anchor master roles 202A(1) and 202A(2), respectively, becomes equal to (including less than or equal to) a distance threshold 806D) or (ii) a maximum hop count from a would-be anchor master of a merged cluster does not exceed some threshold value (e.g., if a maximum hop count of a hypothetical merged cluster becomes equal to (including less than or equal to) a hop count threshold 806HC). More generally, cluster merging subsystem 804 may ascertain if a distance 802 or if a hop count of a hypothetical merged cluster comports with (e.g., matches, is greater than, is less than, is greater than or equal to, is less than or equal to, triggers a comparison including, or a combination thereof) a distance threshold 806D or a hop count threshold 806HC, respectively, in order to determine an anchor master role 202A in conjunction with deciding whether (or not) to merge clusters 302(1) and 302(2).

The example techniques and approaches described herein support various different usage scenarios. For example, as noted herein above, example techniques and approaches may be implemented in a Wi-Fi scenario. More specifically, but by way of example only, they may be implemented in Wi-Fi networks in which neighbor awareness networking (NAN) is being utilized in accordance with so called "Wi-Fi Aware" technology. With NAN generally, and "Wi-Fi Aware" technology specifically, social networking may be at least partially standardized or synchronized so as to facilitate relatively faster or more certain discovery or advertising of services within direct or indirect radio range of a wireless node.

In one or more example usage scenarios, certain example embodiments for NAN proximity-based enhancement generally may enable more efficient organization or coordination of one or more NAN clusters. With regard to first example aspects, which are described herein above with particular reference to FIG. 5, a tighter locality of an anchor master of a cluster may be achieved by considering at least one distance to one or more one-hop neighbors of a first wireless communication device having an anchor master role. With regard to second example aspects, which are described herein above with particular reference to FIG. 6, a given wireless communication device may investigate a possibility of joining a different cluster if a current anchor master is becoming more physically remote due to movement by one or both devices. Instead of having a current anchor master become unavailable and then waiting until some device assumes an anchor master role, a wireless communication device may proactively change allegiance to a different anchor master and thereby potentially avoid a period when the device has no anchor master.

Distances between two or more devices, whether they are computed via WLS or another technique, are described herein above for certain example embodiments as being applicable in a NAN context. However, distance measurements are not so limited. Distance measurements may additionally or alternatively be applied to coordinating wireless communication devices for beacon or time synchronization generally.

An obtained distance (computed via WLS or another technique) may be incorporated as a factor in deciding whether to update a time maintained by a given wireless communication device based on a timestamp and time quality indication received from another wireless communication device. A capability to use distance (generally or as computed via WLS or another technique) for coordinating behavior of wireless communication devices may be announced in a beacon or another transmitted frame. A reference location may be triangulated by sharing or dispersing distance information. A distance to a reference location (computed via WLS or another technique) may be sent, for instance, in one or more frames (e.g., action frames as a service announcement or to publish them). Receipt of multiple distances from multiple sources may enable an accurate triangulation of a reference location.

FIG. 9 depicts an example device 900 that can implement various aspects of the mechanisms and processes described herein. For certain example embodiments, device 900 may be realized as any one or more of a variety of different devices, including but not limited to, a media device, a computer device, a television set-top box, a video processing and/or rendering device, an Ethernet interface, a switch, an access point (AP), a home appliance device, a gaming device, an electronic device, a vehicle, a workstation, a smart phone, a tablet, a printer, a home automation device, a security or safety device such as a camera or a fire detector or a door lock, a wearable such as a smart watch or intelligent glasses, a Wi-Fi chip, another type of computing device, or some combination thereof. Device 900 may be implemented as a System-on-Chip (SoC).

For certain example implementations, device 900 may include electronic circuitry, which has at least one hardware component or tangible aspect; at least one microprocessor; at least one memory; input-output (I/O) logic control; one or more modules; one or more communication interfaces or components; other hardware, firmware, or software applicable to enabling a device to function; some combination thereof; or so forth. Device 900 may also include at least one internal (e.g., integrated) data bus (not explicitly shown in FIG. 9) that couples various components of the device for data communication between or among the various components. A wireless communication device that comprises device 900 or includes device 900 as a sub-part thereof may be implemented with many combinations of differing components.

Continuing with FIG. 9, example device 900 as illustrated may include various components such as an input-output (I/O) logic control 902 (e.g., which may include electronic circuitry) or a microprocessor 904 (e.g., at least one of a microcontroller, a digital signal processor (DSP), a power-efficient mobile-oriented processing unit, or a combination thereof). Device 900 may also include at least one memory 906, which may include any one or more types of memory, such as random access memory (RAM), low-latency non-volatile memory (e.g., Flash memory), read only memory (ROM), one-time programmable memory, other suitable electronic data storage, some combination thereof, or so forth. By way of example only, memory 906 may include one or more tangible or non-transitory storage media. Additionally or alternatively, device 900 may include a memory interface for accessing supplementary or removable or expandable off-chip memory, such as an external Flash memory module. Device 900 may also include various stored, executable, or executing firmware or software, such as an operating system 908, which may include computer-executable instructions maintained by memory 906 and executed by microprocessor 904. Device 900 may also include other various communication interfaces; communication components; other hardware, firmware, or software; some combination thereof; or so forth. An example of a communication component may include, but is not limited to, at least one transceiver 104 (e.g., which is described herein above with particular reference to at least FIG. 1 or 3).

Example device 900 may also include a controller 312 that may comprise a neighbor awareness networking (NAN) proximity-based enhancement system (PES) 106 that enables at least some beaconing within a wireless network based on an indication of distance or at least some proximity-based enhancement of NAN to be implemented as described herein. A controller 312 and NAN proximity-based enhancement systems 106 are explicitly illustrated in FIGS. 1 and 3. However, various example implementations or aspects of a controller 312 or a NAN proximity-based enhancement system 106 are described hereinabove with reference to any one or more of FIGS. 1-8. A controller 312 or a NAN proximity-based enhancement system 106 may be implemented in hardware, firmware, software, combinations thereof, or so forth.

One or more of the example methods or techniques or processes that are described hereinabove may take the form of at least one computer program product that is accessible from a computer-usable or computer-readable medium providing program code for use by or in connection with a computer or any instruction execution system. For purposes of this description, a computer-usable or computer-readable medium may be any apparatus that can tangibly store a program for use by or in connection with an instruction execution system, apparatus, or device. A medium may be an electronic, magnetic, optical, electromagnetic, infrared, semiconductor, or a combination thereof, etc. system (or apparatus or device or article of manufacture). Examples of a computer-readable medium may include, but are not limited to, a semiconductor or solid state memory, magnetic tape, a removable computer diskette, a random access memory (RAM), a read-only memory (ROM), a rigid magnetic disk, an optical disc, or a combination thereof. Examples of optical discs may include, but are not limited to, a compact disc-read only memory (CD-ROM), a compact disc-read/write (CD-R/W), digital versatile disc (DVD), or a combination thereof. A computer-usable or computer-readable medium may include computer-readable memory devices, which may include any of the devices or mediums discussed above, although it excludes signals, signal transmission, and carrier waves. With regard to terminology, unless context dictates otherwise, use herein of the word "or" may be considered use of an "inclusive or," or a term that permits inclusion or application of one or more items that are linked by the word "or" (e.g., a phrase "A or B" may be interpreted as permitting just "A," just "B," or both "A" and "B").

Although subject matter has been described in language specific to structural features and/or methodological operations, it is to be understood that the subject matter defined in the appended claims is not necessarily limited to the specific features or operations described above, including orders in which the operations are performed. For example, although some of the techniques discussed above are described in connection with a Neighbor Awareness Network (NAN), the techniques are generally applicable to other types of wireless networks having a beaconing mechanism through which devices share information.

What is claimed is:

1. A computer-readable memory device comprising computer-executable instructions that, responsive to execution by a hardware-based processor, implement a cluster merging subsystem configured to:

receive a wireless signal;

based at least partially on the received wireless signal, obtain an indication of distance between a first wireless communication device that is an anchor master of a first cluster and a second wireless communication device that is another anchor master of a second cluster within a Neighbor Awareness Networking (NAN) wireless network;

compare the indication of distance with a distance threshold;

determine, based at least partially on the comparison, whether to merge the first cluster and the second cluster into a third cluster;

responsive to the determination to merge the first cluster and the second cluster into the third cluster, determine whether the first wireless communication device or the second wireless communication device is to act as an anchor master of the third cluster;

responsive to the determination that the first wireless communication is to act as the anchor master of the third cluster, cause the second wireless communication device to relinquish acting as the anchor master of the second cluster; or responsive to the determination that the second wireless communication is to act as the anchor master of the third cluster, cause the first wireless communication device to relinquish acting as the anchor master of the first cluster; and merge the first cluster and the second cluster into the third cluster with either the first wireless communication device or the second wireless communication device acting as the anchor master of the third cluster.

2. The computer-readable memory device of claim 1, wherein the determination to merge the first cluster and the second cluster is based on the indication of distance being less than the distance threshold.

3. The computer-readable memory device of claim 2, wherein:

the cluster merging subsystem is further configured to obtain a maximum hop count from the first wireless communication device to other wireless communication devices that are within the first cluster and the second cluster, and the determination to merge the first cluster and the second cluster is also based on the maximum hop count being less than a hop count threshold.

4. The computer-readable memory device of claim 1, wherein:

the first cluster includes a third wireless communication device that is a one-hop neighbor of the first wireless communication device; and the determination of whether the first wireless communication device or the second wireless communication device is to act as the anchor master of the third cluster is based on:

an additional indication of distance between the first wireless communication device and the third wireless communication device, and another additional indication of distance between the second wireless communication device and the third wireless communication device.

5. The computer-readable memory device of claim 4, wherein the determination that the first wireless communication device is to act as the anchor master of the third cluster is responsive to the additional indication of distance being less than the other additional indication of distance.

6. The computer-readable memory device of claim 4, wherein the determination that the second wireless communication device is to act as the anchor master of the third cluster is responsive the additional indication of distance being greater than the other additional indication of distance.

7. The computer-readable memory device of claim 1, wherein the anchor master of the third cluster is responsible for establishing a synchronization time for the third cluster.

8. A method comprising:

receiving a wireless signal;

based at least partially on the received wireless signal, obtaining an indication of distance between two anchor master devices within a Neighbor Awareness Networking (NAN) wireless network, the two anchor master devices including a first anchor master device of a first cluster and a second anchor master device of a second cluster;

comparing the indication of distance with a distance threshold;

determining, based at least partially on the comparison, whether to form a third cluster that includes the first cluster and the second cluster;

choosing, responsive to the determination to form the third cluster, which one anchor master device of the two anchor master devices is to act as an anchor master of the third cluster;

responsive to choosing the first anchor master device, causing the second anchor master device to relinquish acting as the anchor master of the second cluster; or responsive to choosing the second anchor master device, causing the first anchor master device to relinquish acting as the anchor master of the first cluster; and forming the third cluster with the chosen one anchor master device acting as the anchor master of the third cluster.

9. The method of claim 8, wherein:

the first cluster includes a one-hop neighbor device of the first anchor master device; and the choosing comprises comparing an additional indication of distance between the first anchor master device and the one-hop neighbor device with another additional indication of distance between the second anchor master device and the one-hop neighbor device.

10. The method of claim 9, wherein choosing the second anchor master device is responsive to the additional indication of distance being greater than the other additional indication of distance.

11. The method of claim 9, wherein:

choosing the first anchor master device is responsive to the additional indication of distance being less than the other additional indication of distance; and the causing of the second anchor master device to relinquish acting as the anchor master of the second cluster comprises causing the first anchor master device to send a request to the second anchor master device to relinquish acting as the anchor master of the second cluster.

12. The method of claim 8, further comprising:

obtaining a maximum hop count from the first anchor master device to other devices within the first cluster and the second cluster; and comparing the maximum hop count to a hop count threshold, and wherein the determination of whether to form the third cluster is also based on the comparison of the maximum hop count to the hop count threshold.

13. The method of claim 12, wherein:
the determination to form the third cluster is based on:
the indication of distance being less than or equal to the distance threshold; and
the maximum hop count from the first anchor master device being less than or equal to the hop count threshold.

14. A first wireless communication device configured to act as an anchor master of a first cluster that is within a Neighbor Awareness Networking (NAN) wireless network, the first wireless communication device comprising:
a transceiver configured to receive a wireless signal; and
a controller configured to
(i) based at least partially on the wireless signal received by the transceiver, obtain an indication of distance between the first wireless communication device and a second wireless communication device, the second wireless communication device being another anchor master of a second cluster within the NAN wireless network,
(ii) compare the indication of distance with a distance threshold,
(iii) determine, based at least partially on the comparison, whether to merge the first cluster and the second cluster into a third cluster,
(iv) choose, responsive to the determination to merge the first cluster and the second cluster, whether the first wireless communication device or the second wireless communication device is to act as an anchor master of the third cluster,
responsive to choosing the first wireless communication device, causing the second wireless communication device to relinquish acting as the anchor master of the second cluster, or
responsive to choosing the second wireless communication device, causing the first wireless communication device to relinquish acting as the anchor master of the first cluster, and
(v) cause the third cluster to be formed with either the first wireless communication device or the second wireless communication device acting as the anchor master of the third cluster.

15. The first wireless communication device of claim 14, wherein the wireless signal comprises a NAN management frame in accordance with a wireless location service (WLS).

16. The first wireless communication device of claim 14, wherein the determination to merge the first cluster and the second cluster is based on the indication of distance being less than the distance threshold.

17. The first wireless communication device of claim 14, wherein:
the first cluster includes a one-hop neighbor device of the first wireless communication device; and
the choosing is based on a comparison of an additional indication of distance between the first wireless communication device and the one-hop neighbor device with another additional indication of distance between the second wireless communication device and the one-hop neighbor device.

18. The first wireless communication device of claim 17, wherein the first wireless communication device and the one-hop neighbor device are temporally-synchronized, and
the controller is further configured to obtain the additional indication of distance based at least partially on a time of flight of an additional wireless signal that is received by the transceiver.

19. The first wireless communication device of claim 17, wherein:
the choosing of the first wireless communication device to act as the anchor master of the third cluster is responsive to the additional indication of distance being less than the other additional indication of distance; and
the causing of the second wireless communication device to relinquish acting as the anchor master of the second cluster comprises sending a request to the second wireless communication device that causes the second wireless communication device to relinquish acting as the anchor master of the second cluster.

20. The first wireless communication device of claim 17, wherein the choosing of the second wireless communication device to act as the anchor master of the third cluster is responsive to the additional indication of distance being greater than the other additional indication of distance.

* * * * *